(12) United States Patent
Kato et al.

(10) Patent No.: US 11,456,581 B2
(45) Date of Patent: Sep. 27, 2022

(54) ROUTING STRUCTURE OF WIRE HARNESS

(71) Applicant: DAIWA KASEI INDUSTRY CO., LTD., Okazaki (JP)

(72) Inventors: Makoto Kato, Okazaki (JP); Katsuya Hirakawa, Okazaki (JP)

(73) Assignee: DAIWA KASEI INDUSTRY CO., LTD., Okazaki (JP)

( * ) Notice: Subject to any disclaimer, the term of this patent is extended or adjusted under 35 U.S.C. 154(b) by 0 days.

(21) Appl. No.: 17/368,058

(22) Filed: Jul. 6, 2021

(65) Prior Publication Data

US 2022/0060004 A1 Feb. 24, 2022

(30) Foreign Application Priority Data

Aug. 24, 2020 (JP) .............................. JP2020-140681

(51) Int. Cl.
*H02G 3/04* (2006.01)
*B60R 16/02* (2006.01)

(52) U.S. Cl.
CPC ......... *H02G 3/045* (2013.01); *B60R 16/0215* (2013.01)

(58) Field of Classification Search
None
See application file for complete search history.

(56) References Cited

U.S. PATENT DOCUMENTS

| 5,297,334 A * | 3/1994 | Johnson .............. B60R 16/0215 49/167 |
| 5,780,773 A * | 7/1998 | Wakamatsu ......... H02G 3/0475 174/95 |
| 5,806,812 A * | 9/1998 | Jacobs ................ B60R 16/0215 248/73 |
| 6,996,904 B1 * | 2/2006 | Howell ................ H01R 9/2416 29/33 F |
| 7,197,355 B2 * | 3/2007 | Nelson ............... G01N 15/1475 356/432 |

(Continued)

FOREIGN PATENT DOCUMENTS

| CN | 110094704 A * | 8/2019 | ........... B60Q 1/0088 |
| CN | 112298066 A * | 2/2021 | ......... B60R 16/0215 |

(Continued)

*Primary Examiner* — Timothy J. Dole
*Assistant Examiner* — Muhammed Azam
(74) *Attorney, Agent, or Firm* — McClure, Qualey & Rodack, LLP

(57) ABSTRACT

In a vehicle body, a body portion having a base end side portion is engaged with a plate-shaped member and extending along the plate-shaped member toward the leading end side, and a removal-preventing portion for preventing the wire harness stored in a space between the plate-shaped member and the body portion from being removed from the leading end side of the body portion. The wire harness stored in the space is prevented from being removed at the leading end side of the body portion by the removal-preventing portion pivoting according to the storage. By a series of rotations of the removal-preventing portion up to the storage, a pivotal body upper portion of the removal-preventing portion disposed at a high position in a height direction extending from the plate-shaped member is moved to a lower position, thereby reducing the height of the entirety of the routing structure.

5 Claims, 7 Drawing Sheets

(56) References Cited

U.S. PATENT DOCUMENTS

| | | | | |
|---|---|---|---|---|
| 8,342,211 B2* | 1/2013 | King | .................. | H02G 9/025 |
| | | | | 104/275 |
| 9,896,252 B2 | 2/2018 | Kato et al. | | |
| 9,938,729 B2* | 4/2018 | Coon | .................. | E04F 17/08 |
| 2007/0184714 A1* | 8/2007 | Pfluger | .................. | H02G 3/32 |
| | | | | 439/584 |
| 2008/0105796 A1* | 5/2008 | Nix | .................. | B60R 16/0215 |
| | | | | 248/74.1 |
| 2008/0190544 A1* | 8/2008 | Hopf | .................. | H02G 3/30 |
| | | | | 156/73.5 |
| 2009/0056230 A1* | 3/2009 | Flendrig | .................. | B60R 16/0215 |
| | | | | 49/502 |
| 2012/0281958 A1* | 11/2012 | Petersen | .................. | G02B 6/4466 |
| | | | | 174/135 |
| 2016/0178089 A1* | 6/2016 | Yadav | .................. | H02G 3/32 |
| | | | | 248/74.2 |
| 2016/0264073 A1* | 9/2016 | Katou | .................. | B60R 16/0215 |
| 2018/0019703 A1* | 1/2018 | Almy | .................. | H02S 30/10 |
| 2018/0269667 A1* | 9/2018 | Schaefer | .................. | H02G 3/30 |
| 2018/0337388 A1* | 11/2018 | Chaen | .................. | H01M 50/507 |
| 2018/0339667 A1* | 11/2018 | Hiramitsu | .................. | B60R 16/0215 |
| 2019/0267785 A1* | 8/2019 | Gintz | .................. | H02G 3/0487 |
| 2021/0229607 A1* | 7/2021 | Fujimura | .................. | H02G 3/0418 |
| 2022/0060004 A1* | 2/2022 | Kato | .................. | H02G 3/045 |

FOREIGN PATENT DOCUMENTS

| | | | | |
|---|---|---|---|---|
| DE | 19510932 A1 | * | 10/1995 | ............. B60R 11/00 |
| DE | 19522405 C1 | * | 11/1996 | ......... B60R 16/0215 |
| DE | 10206206 A1 | * | 9/2003 | ......... B60R 16/0215 |
| DE | 10160268 B4 | * | 12/2004 | ......... B60R 16/0215 |
| DE | 202005019103 U1 | * | 5/2006 | ................ B60J 5/06 |
| DE | 60025752 T2 | * | 7/2006 | ............. B60N 3/046 |
| EP | 0750378 B1 | | 6/1996 | |
| EP | 1026043 A2 | * | 8/2000 | ......... B60R 16/0215 |
| JP | 4250194 B1 | * | 4/2009 | ............. B60R 16/02 |
| JP | 2013090397 A | * | 5/2013 | ................ G02B 6/46 |
| JP | 2017-044243 A | | 3/2017 | |

* cited by examiner

ROUTING STRUCTURE OF WIRE HARNESS

RELATED APPLICATIONS

This application claims the priority of Japanese Patent Application No. 2020-140681 filed on Aug. 24, 2020. The disclosure of the prior application is hereby incorporated herein in the entirety by reference.

BACKGROUND OF THE INVENTION

Field of the Invention

This invention relates to a routing structure of a wire harness.

Description of Related Art

For vehicles, a clamp in which a grip portion for gripping a wire harness and an engagement portion for combining with a vehicle body are integrated is used in order to fix the wire harness to the vehicle body. The clamp with the wire harness is bound and held by a binding member such as tape, and the engagement portion is inserted in a fixing hole of the vehicle body in the bound and held state, to combine the clamp and the wire harness with the vehicle body.

The wire harness is a wiring bundle formed of multiple wires including a signal line, a power supply line, and the like, is bound and held by tape or the like, and has a substantially round cross-section. Such a wire harness is widely used in vehicles at present. In recent years, routing that allows the height from the main surface of a plate-shaped member to be further reduced when the wire harness is combined with the plate-shaped member disposed in the vehicle body, is desired in order to assuredly maintain a wider vehicle interior space.

However, for example, if the wire harness is combined with the plate-shaped member of the vehicle body by using a belt clamp as described in Japanese Laid-Open Patent Publication No. 2017-44243 in a low height state where the wire harness is press-deformed from the upper side and laterally expanded, the outer periphery of the wire harness in the low height state is surrounded by the belt, and is uniformly pressed toward the center portion on the inner periphery side from the outer periphery side. As a result, the wire harness in the low height state approaches an original state where the wire harness has the round cross-section, and the low height state cannot be maintained. Furthermore, in Japanese Laid-Open Patent Publication No. 2017-44243, a buckle for fixing the belt that annularly surrounds the wire harness is disposed immediately below the engagement portion serving as a combining portion for combining with the plate-shaped member of the vehicle body. As a result, the height of the belt clamp itself is increased, and the entirety of the routing structure of the wire harness is hindered from having a low height.

An object of this invention is to reduce, in a routing structure of a wire harness for such routing as to combine the wire harness with a vehicle body, the height of the entire structure and facilitate wire harness combining work.

SUMMARY OF THE INVENTION

A routing structure of a wire harness for solving the aforementioned problem includes:

a body portion having a base end side portion connected to or engaged with and fixed to a plate-shaped portion disposed at a vehicle body, and a leading end side portion extending along a main surface of the plate-shaped portion, the body portion configured to allow a wire harness to be stored from the leading end side portion toward the base end side portion in a space formed between the body portion and the main surface; and a removal-preventing portion disposed at a leading end side of the body portion, the removal-preventing portion configured to prevent the wire harness stored in the space from being removed from the space.

The removal-preventing portion integrally has a pivot connected to the body portion, and a pivotal body connected to the pivot.

The pivotal body has a pressing piece extending from the pivot into the space, a pivotal body upper portion extending from the pivot in a direction opposite to a direction in which the pressing piece extends, the pivotal body upper portion disposed upward of the pivot in a height direction extending from the main surface of the plate-shaped portion, and a pivotal body lower portion integrally connected to the pivotal body upper portion and disposed downward of the pivot.

A surface, on a side opposite to the space, extending from the pivotal body upper portion to the pivotal body lower portion is disposed as a tilted guide surface tilted so as to oppose the main surface of the plate-shaped portion.

When the wire harness having a thickness greater than a height of the space is stored in the space, the wire harness is pressed against the tilted guide surface, to cause the pivotal body to pivot around the pivot such that the pressing piece is moved toward the body portion in the space, the pivotal body upper portion is moved toward the main surface of plate-shaped portion, and the pivotal body lower portion is moved into the space, so that the wire harness is press-deformed by the tilted guide surface and is moved into between the pivotal body lower portion and the main surface of the plate-shaped portion in a state where the wire harness has a reduced height, and the pivotal body lower portion is pushed upward toward the pressing piece to allow the wire harness to enter the space.

When the wire harness enters the space, the wire harness is moved into between the pressing piece and the main surface of the plate-shaped portion, so that the pivotal body is prevented from pivoting around the pivot such that the pressing piece is moved toward the main surface of the plate-shaped portion.

In a storage state where the wire harness is stored in the space, the pivotal body lower portion is released from an upward pushed state, and is moved to a position at which an entrance port into the space is closed, and the stored wire harness is prevented from being removed, while the pressing piece is maintained so as to dispose the wire harness thereunder, reverse rotation of the pivotal body is continuously prevented, and the pivotal body upper portion is maintained at a position lower than a position at start of rotation, by preceding rotation of the pivotal body.

In the configuration of this invention, the wire harness is not held at a position distant from the plate-shaped portion over a certain height as in conventional art but is placed immediately above the plate-shaped portion, whereby the routing structure can have a further reduced height. In the configuration of this invention, the pivotal body (removal-preventing portion) is disposed at the leading end side of the body portion extending across the wire harness disposed immediately above the plate-shaped portion, and the pivotal body is pressed in a predetermined direction and pivoted, whereby the entrance port into the space (a space in which the wire harness is stored) can be formed between the plate-shaped portion and the body portion. Therefore, the pivotal body is merely pressed in the predetermined direction by the wire harness, whereby the wire harness can be easily moved into the space and stored. When the wire harness has been stored in the space, the pivotal body (removal-preventing piece) automatically closes the entrance port to prevent the wire harness from being removed, and the pivotal body (pressing piece) is prevented from pivoting in the direction opposite to the direction of its preceding rotation. Therefore, the removal preventing state can be stably maintained. Furthermore, when the pivotal body is pressed in the predetermined direction by the wire harness, the pressing is performed on the tilted guide surface, so that the wire harness is press-deformed downward, and the height can be easily reduced, and the wire harness can be stored in the space while remaining in the low height state. That is, by using the tilted guide surface, reduction of the height of the wire harness and combination of the wire harness are simultaneously performed, whereby the combining work can be very easily performed.

The pressing piece can be maintained so as to press the wire harness downward in the storage state. In this configuration, the wire harness can be stably stored in the space between the plate-shaped portion and the body portion without misalignment. Furthermore, reverse rotation of the pivotal body can also be assuredly prevented.

An under base portion disposed between the pressing piece and the main surface in the space, and held between the main surface and the stored wire harness in the storage state, may be provided. In this configuration, the wire harness can be stored in the space between the plate-shaped portion and the body portion so as to protect the wire harness from the unevenness formed in the main surface of the plate-shaped portion.

A reverse rotation preventing portion capable of preventing the pivotal body from rotating in a direction opposite to a direction of rotation in which the pivotal body upper portion is moved downward, the pivotal body lower portion is moved toward the space, and the pressing piece is moved toward the body portion before the wire harness is stored, may be provided. In this configuration, pivoting of the pivotal body toward an unnecessary region can be prohibited, whereby damage caused by unnecessary rotation can be prevented.

The body portion may have a body leading end portion having a stiffness lower than that of the base end side portion and is bent more easily than the base end side portion, and can be bent and deformed together with the pivotal body lower portion when the pivotal body lower portion enters the upward pushed state. When the wire harness is stored in the space between the plate-shaped portion and the body portion, the pivotal body lower portion needs to be pushed upward by the wire harness. At this time, in a configuration in which, in addition to the pivotal body lower portion itself being bent and pushed upward, the leading end side portion of the body portion is also bent and pushed upward, the entrance port through which the wire harness is moved into the space can be more easily formed. Meanwhile, the base end side portion has a high stiffness, whereby the space can assuredly maintain a predetermined height.

DESCRIPTION OF THE PREFERRED EMBODIMENTS

An embodiment of this invention will be described below with reference to the drawings.

Figure 1:
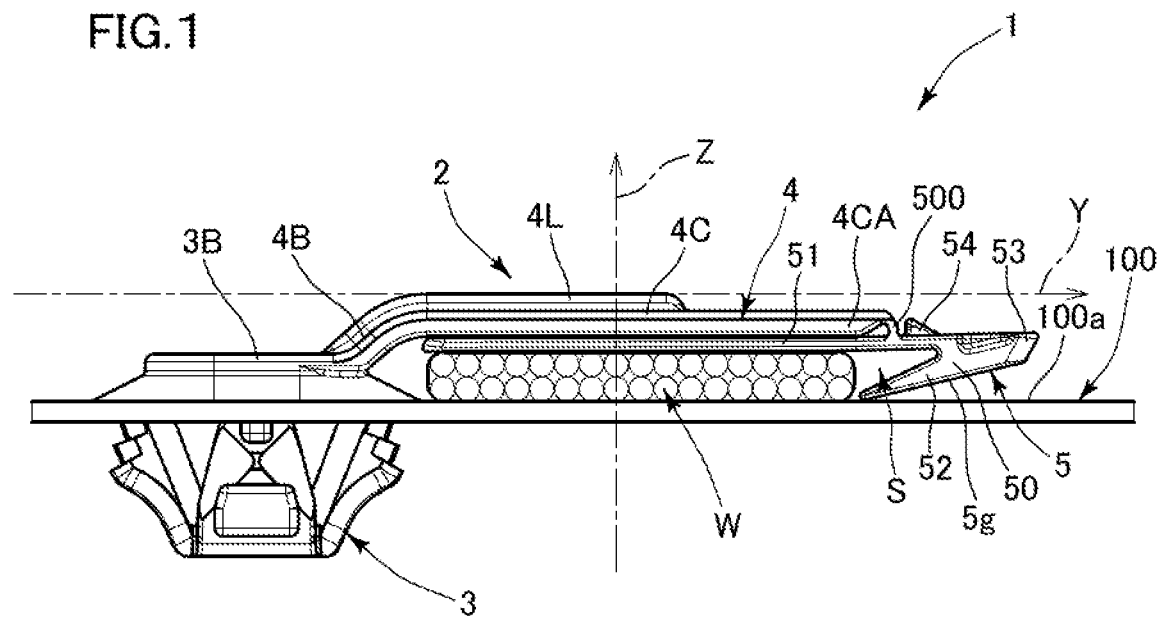
FIG. 1 is a front view of a routing structure of a wire harness according to an embodiment.

A routing structure 1 of a wire harness W according to an embodiment includes an elongated wire harness W, a plate-shaped member 100 (plate-shaped portion) disposed at a vehicle body, a body portion 4 having a base end side portion connected to or engaged with and fixed to the plate-shaped member 100, extending along a main surface 100a of the plate-shaped member 100 toward the leading end side, and allowing the wire harness W to be stored from the leading end side of the body portion 4 in a space S formed between the body portion 4 and the main surface 100a, and a removal-preventing portion 5 for preventing the wire harness W stored in the space S from being removed from the leading end side of the body portion 4, as shown in FIG. 1. The wire harness W stored in the space S is prevented from being removed at the leading end side of the body portion 4 by the removal-preventing portion 5 serving as a pivotal portion that pivots according to the wire harness W being stored, and the removal-preventing portion 5 is maintained so as to be prevented from pivoting in the opposite direction. A portion (pivotal body upper portion 53), of the removal-preventing portion 5, which is disposed at the highest position relative to the main surface 100a of the plate-shaped member 100 is moved to a lower position in the entirety of the routing structure 1 by a series of rotations of the removal-preventing portion 5 according to the storage, whereby the routing structure 1 having an entirely reduced height is formed.

Figure 5:
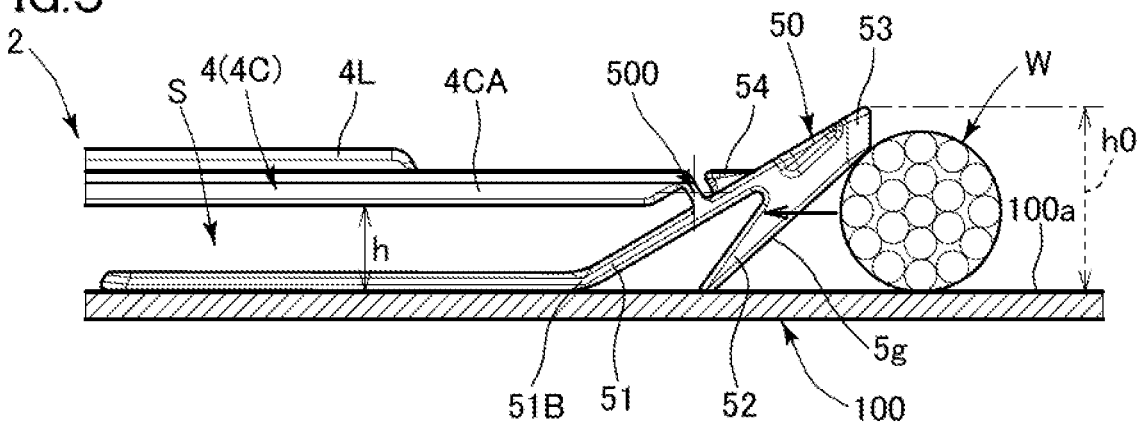
FIG. 5 is a partially enlarged view of a part of the region shown in FIG. 4 in an enlarged manner for illustrating a procedure for forming the routing structure shown in FIG. 1.

The wire harness W is a known flexible wiring bundle that is formed of multiple wires such as a signal line and a power supply line, and that has a round cross-section (see FIG. 5). In a case where the wire harness W has a thickness (height) greater than a height width h of the space S as shown in FIG. 5, when the routing structure 1 of the wire harness W is formed, that is, when the wire harness W is stored in the space S, the wire harness W is press-deformed and expanded in the lateral width direction to be in a low height state (see FIG. 1) in which the wire harness W has a reduced height. The wire harness W of this invention is not limited to a wire harness having a thickness (height) greater than the space S, and may be a wire harness having a height less than the space S. The routing structure 1 of this invention is also applicable to an elongated wiring member such as a flat cable and flat-plate-shaped wiring instead of the wire harness W.

Figure 2:
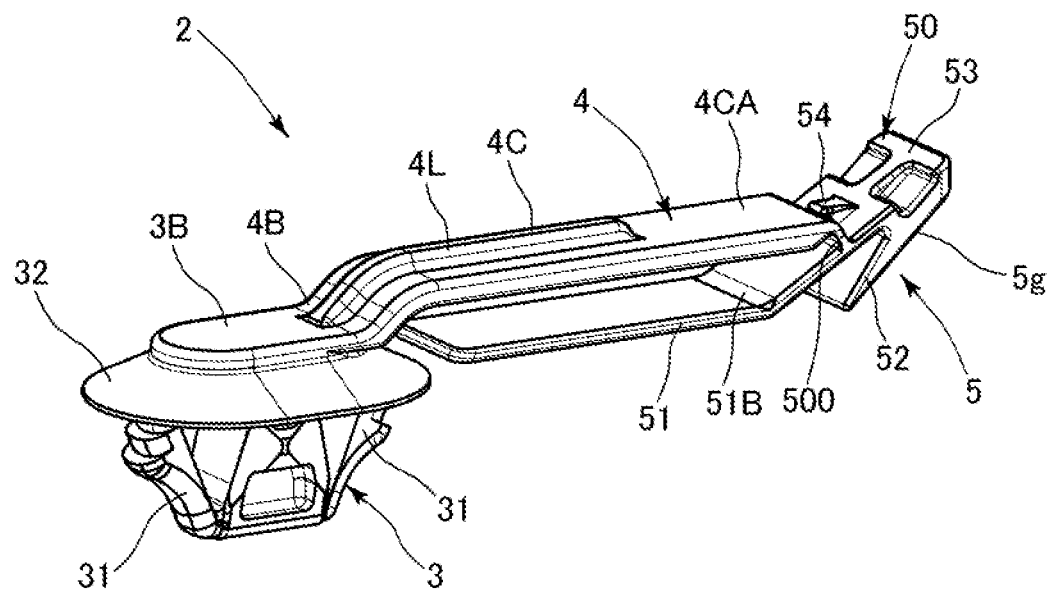
FIG. 2 is a perspective view of a clamp used for the routing structure shown in FIG. 1.
Figure 3:
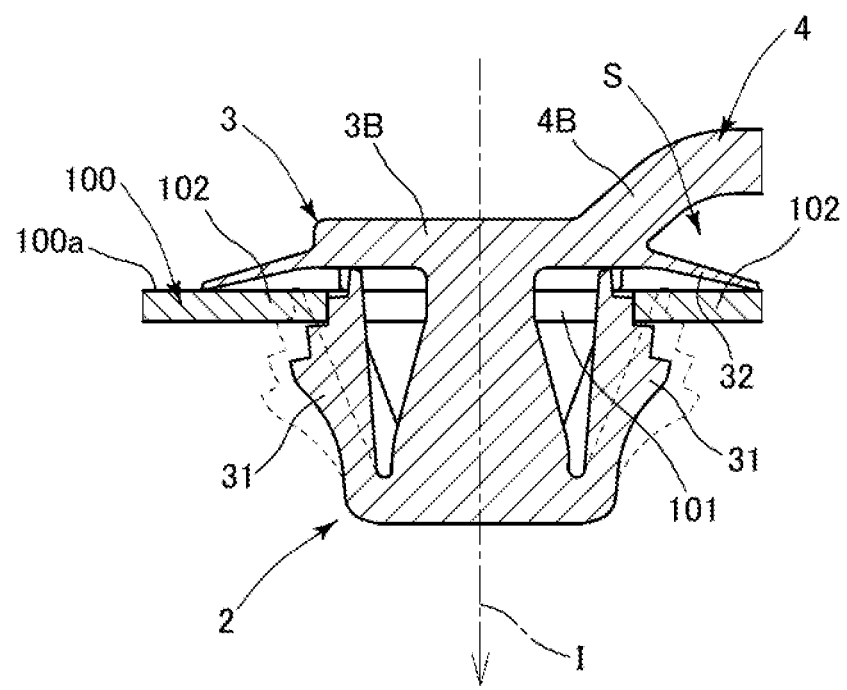
FIG. 3 is a cross-sectional view illustrating a state where the clamp is fixed to a plate-shape portion in the routing structure shown in FIG. 1.

Firstly, a state where the wire harness W has not been stored in the space S before the routing structure 1 of the wire harness W shown in FIG. 1 is formed, will be described with reference to FIG. 2 to FIG. 4.

For the routing structure 1 shown in FIG. 1, a clamp 2 in which the body portion 4 and the removal-preventing portion 5 are integrated with each other is used. The clamp 2 integrally has an engagement portion 3 that is inserted in and lock-engaged with a fixing hole 101 disposed at a vehicle body, the body portion 4, and the removal-preventing portion 5, as shown in FIG. 3. In this embodiment, the clamp 2 is an injection-molded resin product, and can grip and hold the wire harness W between the plate-shaped member 100 and the body portion 4.

When the engagement portion 3 is inserted in the fixing hole 101, an elastic lock-engaging piece 31 lock-engages with a peripheral portion 102 of the fixing hole 101 from the depth side in an insertion direction I and is prevented from being removed, and the peripheral portion 102 is held between the elastic lock-engaging piece 31 and a dish-shaped portion 32. Thus, the clamp 2 is in a fixed state where the clamp 2 is fixed to the plate-shaped member 100. In this embodiment, the engagement portion 3 is not formed at the center of the body portion 4 and is formed so as to be close to one end side (body base end portion 4B side).

In the fixed state where the engagement portion 3 is inserted in and fixed to the plate-shaped member 100, the body portion 4 extends along the main surface 100a of the plate-shaped member 100 in front of the engagement portion 3 disposed in the insertion direction I in the plate-shaped member 100, and forms the space S between the body portion 4 and the main surface 100a. In this embodiment, as shown in FIG. 4, the body portion 4 has a body base end portion 4B that extends diagonally upward from a bottom 3B (end portion on the opposite side in the insertion direction I (see FIG. 3)) of the engagement portion 3 so as to be separated from the main surface 100a of the plate-shaped member 100, and a body extending portion 4C extending from the body base end portion 4B in parallel with the main surface 100a of the plate-shaped member 100 so as to be separated from the main surface 100a of the plate-shaped member 100 over a predetermined height width h (see FIG. 5). The body extending portion 4C may not necessarily be parallel with the main surface 100a as long as the space S is formed between the main surface 100a and the body extending portion 4C.

Figure 4:
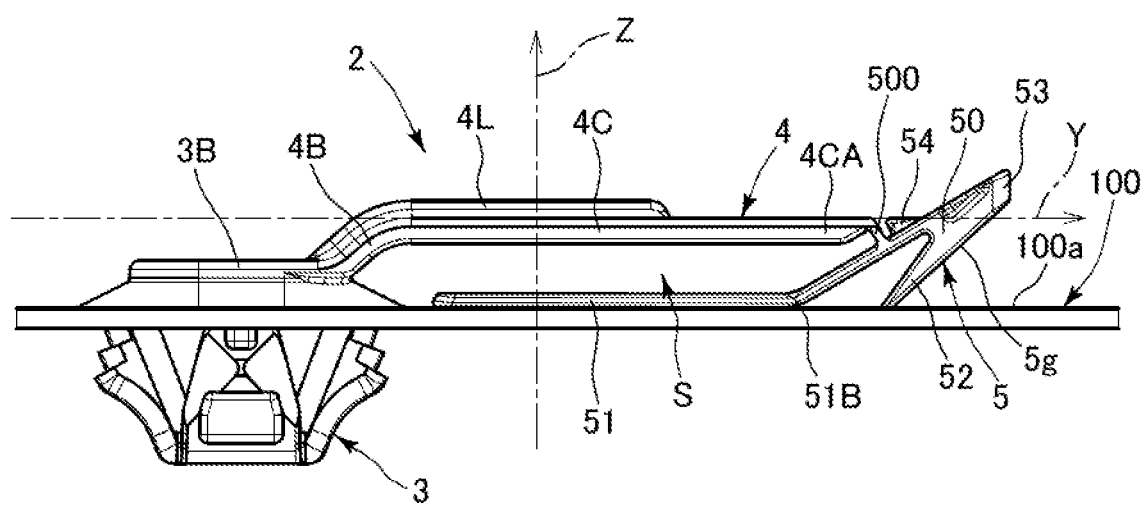
FIG. 4 is a front view illustrating a state where the wire harness has not been stored yet in the routing structure shown in FIG. 1.

The body portion 4 is formed such that a base end side portion in a section from the body base end portion 4B to the body extending portion 4C has a stiffness higher than that of a body leading end portion 4CA disposed forward thereof, as shown in FIG. 4. In this embodiment, the stiffness is high on the base end side of the body portion 4 in which a rib 4L is formed, and the body leading end portion 4CA in which the rib 4L is not formed has a low stiffness and is more easily bent as compared with the base end side portion.

The removal-preventing portion 5 integrally has a pivot 500 connected to the leading end side portion of the body portion 4, and a pivotal body 50 connected to the pivot 500.

The pivot 500 serves as a pivot shaft for pivoting the pivotal body 50. In this embodiment, the pivot 500 is formed as a bendable connecting portion that is connected to the leading end of the body portion 4, and is bendable most easily in the entirety of the clamp 2. The pivot 500 having such a structure linearly extends diagonally downward in the extending direction Y from the leading end, in the extending direction Y, of the body portion 4, as shown in FIG. 4, and is disposed so as to be bendable and deformable in the length section, and the pivotal body 50 is pivotable by bending and deforming the pivot 500. However, since the pivoting is caused by the bending, the position of the pivotal axis may be slightly shifted according to the bent state before, after, and during the pivoting. The pivot 500 may have a pivotal axis set at a predetermined fixed position so as not to cause such a shift, and the pivotal body 50 may be caused to pivot around the set pivotal axis.

In this invention, pivoting the pivotal body 50 around the pivot 500 includes pivoting the pivotal body 50 by any bending caused in the length direction of the pivot 500 as in this embodiment, and a slight misalignment of the pivotal axis caused at this time is allowed. Meanwhile, pivoting the pivotal body 50 around the pivotal axis disposed at the fixed position by setting the pivotal axis at the predetermined fixed position may also be included.

The pivotal body 50 integrally has a pressing piece 51 extending from the pivot 500 side into the space S, a removal-preventing piece 52 disposed at the leading end side of the body portion 4 in the space S, and the pivotal body upper portion 53 disposed upward of (at a higher position than) the body portion 4 and the pivot 500 in the height direction Z extending from the main surface 100a of the plate-shaped member 100.

In this embodiment, the pressing piece 51 is formed as an elastic piece that extends diagonally downward from the pivot 500 toward the base end side of the body portion 4, comes into contact with or approaches the main surface 100a of the plate-shaped member 100 and bent therefrom, and linearly extends parallel to the main surface 100a toward the base end side of the body portion 4, in a state of being fixed to the plate-shaped member 100 as described above. A bent portion 51B has a reduced thickness and is formed so as to be more easily bendable than the other sections, in the length direction, of the pressing piece 51.

In this embodiment, the removal-preventing piece 52 is formed as an elastic piece that is disposed on a side deeper than the pressing piece 51 in the extending direction Y, and that extends diagonally downward from a side deeper than the pivot 500 toward the preceding side in the extending direction Y so as to come into contact with or approach (in this example, come into contact with) the main surface 100a of the plate-shaped member 100, in a fixed state where the clamp 2 is fixed to the plate-shaped member 100 as described above.

In this embodiment, the pivotal body upper portion 53 is formed as a connecting portion for connecting the pressing piece 51 and the removal-preventing piece 52 at a high position (upper side) in the height direction Z in a state of being fixed to the plate-shaped member 100 as described above, and the pivotal body upper portion 53 is at a position higher than the body portion 4 and the pivot 500. The pivotal body upper portion 53 extends diagonally upward from the pivot 500 side of the pressing piece 51 toward the leading end side (depth side in the extending direction Y) of the body portion 4 to reach a position (upper side) higher than the body portion 4 and the pivot 500, and is connected to the removal-preventing piece 52 formed as a pivotal body lower portion on the lower side.

In the pivotal body 50, a surface 5g, on a side opposite to the space S side, from the pivotal body upper portion 53 to the removal-preventing piece 52 is disposed as a tilted guide surface 5g tilted so as to oppose the main surface 100a. In this embodiment, the tilted guide surface 5g is formed as a flat surface extending diagonally downward from the position (upper side) higher than the body portion 4 and the pivot 500 so as to form an acute angle relative to the main surface 100a.

The pivotal body 50 has a reverse rotation preventing portion 54 for preventing rotation reverse to rotation in which the pivotal body upper portion 53 is moved downward, the removal-preventing piece 52 is moved toward the space S, and the pressing piece 51 is moved toward the body portion 4 in a state (see FIG. 4) where the wire harness W has not been stored yet. In this embodiment, the reverse rotation preventing portion 54 protrudes from the pivotal body upper portion 53 so as to approach and oppose the pivot 500 at the leading end side (depth side in the extending direction Y) of the body portion 4.

Next, a procedure for forming the routing structure of the wire harness shown in FIG. 1 will be described with reference to FIG. 1, and FIG. 5 to FIG. 7.

Figure 6:
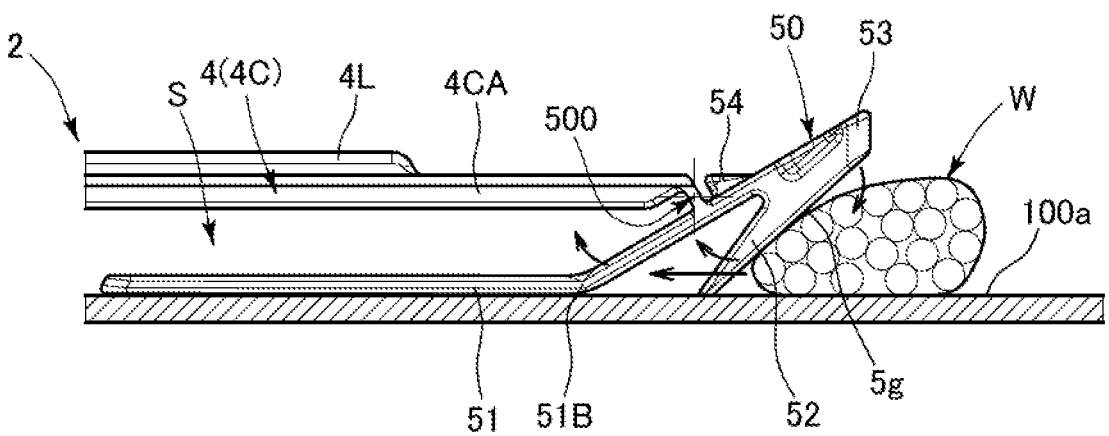
FIG. 6 illustrates a procedure subsequent to that in FIG. 5.
Figure 7:
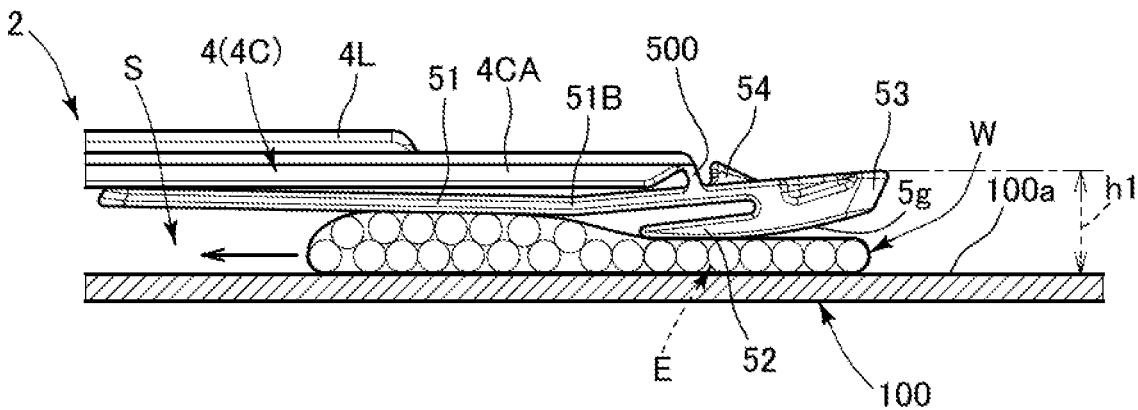
FIG. 7 illustrates a procedure subsequent to that in FIG. 6.

When the wire harness W is stored in the space S, the wire harness W is pressed against the tilted guide surface 5g toward the space S, to cause the pivotal body 50 to pivot around the pivot 500, as shown in FIG. 5. Thus, the pivotal body 50 pivots to move the pivotal body upper portion 53 downward, move the removal-preventing piece 52 toward the space S, and move the pressing piece 51 diagonally upward on the space S side. At this time, the wire harness W is press-deformed by the tilted guide surface 5g to have a reduced height, as shown in FIG. 6, and is moved into between the removal-preventing piece 52 and the main surface 100a, as shown in FIG. 7. At this time, the removal-preventing piece 52 is pushed upward so as to be bent and deformed (elastically deformed), whereby an entrance port E into the space S can be formed, and the wire harness W can enter the space S through the formed entrance port E.

In the state where the removal-preventing piece 52 is pushed upward (see FIG. 7), the body leading end portion 4CA in which the body portion 4 does not have the rib 4L can also be bent and deformed together with the removal-preventing piece 52. Thus, the entrance port E can be assuredly widened in the height direction Z (see FIG. 4).

When the wire harness W enters the entrance port E, the wire harness W is moved into a portion below the pressing piece 51 having been moved upward toward the body portion 4 by pivoting the pivotal body 50, as shown in FIG. 6 and FIG. 7. Thus, even if the pivotal body 50 pivots in the direction opposite to the preceding rotation direction (reverse rotation), the pressing piece 51 comes into contact with the wire harness W disposed on a side in the reverse rotation direction, whereby further reverse direction can be prevented.

In this embodiment, the end of the pressing piece 51 is pressed against the body portion 4, and the pressing piece 51 is maintained to be bent such that a bending angle of the bent portion 51B is increased. Therefore, the pressing piece 51 is maintained to be press-held between the body portion 4 and the wire harness W, specifically, the wire harness W is maintained to be pressed downward by the pressing piece 51, to prevent reverse rotation of the pivotal body 50.

In a storage state where the wire harness W has been fully stored in the space S, as shown in FIG. 1, the removal-preventing piece 52 is released from an upward pushed state shown in FIG. 7(release of the upward pushed state), and is moved to a position at which the entrance port E into the space S is closed to form a state where the stored wire harness W is prevented from being removed. Meanwhile, the pressing piece 51 is maintained so as to dispose the wire harness W thereunder, and reverse rotation of the pivotal body 50 is continuously prevented. Therefore, the wire harness W is maintained so as to be prevented from being removed.

In this embodiment, also in the storage state (see FIG. 1), the pressing piece 51 is maintained so as to be press-held between the body portion 4 and the wire harness W. That is, the pressing piece 51 is maintained to press the wire harness W downward, prevents reverse rotation of the pivotal body 50, and inhibits misalignment of the stored wire harness W.

In the storage state (see FIG. 1), the pivotal body upper portion 53 having been moved downward by the preceding rotation of the pivotal body 50 is maintained at a lower side position lower than a position at the start of the rotation (see FIG. 5). Specifically, the pivotal body upper portion 53 having been moved downward by the preceding rotation is maintained at the same position as or a position (lower side) lower than one or both of the body portion 4 and the pivot 500 in the height direction Z.

In this embodiment, the pivotal body upper portion 53 is moved from a position (height h0: see FIG. 5) higher than the highest position (rib 4L) of the body portion 4 to a position (height h1: see FIG. 7) lower than the highest position (rib 4L) by pivoting the pivotal body 50, and is located at substantially the same height position as the pivot 500. Thus, the routing structure 1 of the wire harness W shown in FIG. 1 is in a state where the height of the clamp 2 is made lower than a height of the clamp 2 disposed before the wire harness W is stored (before the pivotal body 50 starts pivoting).

A portion disposed at the highest position in the pivotal body 50 in the storage state is the end of the reverse rotation preventing portion 54 as shown in FIG. 1, and the end is also maintained at the same position as or a position lower than one or both of the body portion 4 and the pivot 500 in the height direction Z. That is, when the entirety of the pivotal body 50 including the pivotal body upper portion 53 disposed at a position higher than the body portion 4 and the pivot 500 enters the storage state described above, the pivotal body 50 is disposed at the same height as or a height lower than at least one of the body portion 4 and the pivot 500, whereby the height of the clamp 2 is reduced.

Although the wire harness W used in this embodiment has a thickness greater than the height width h of the space S as shown in FIG. 5, the routing structure can also be formed such that a wire harness having a thickness less than the height width h of the space S is stored in the space S by using the tilted guide surface 5g as described above. In a case where the wire harness W has a certain or larger thickness in the storage state, the wire harness W is pressed against the pressing piece 51 to form the reverse rotation preventing state in the storage state. However, in a case where a wire harness has a thickness less than the certain thickness, although the reverse rotation preventing state can be formed by the pressing piece 51, the wire harness may not be pressed against the pressing piece 51.

Thus, the routing structure 1 (see FIG. 1) of the wire harness W according to the above-described embodiment includes the body portion 4 and the removal-preventing portion 5. The body portion 4 has the base end side portion connected to or engaged with and fixed to the plate-shaped member 100 (plate-shaped portion) disposed at a vehicle body, and has the leading end side portion extending along the main surface 100*a* of the plate-shaped member 100, and the body portion 4 allows the wire harness W to be stored from the leading end side toward the base end side in the space S formed between the body portion 4 and the main surface 100*a*. The removal-preventing portion 5 is disposed at the leading end side of the body portion 4 and can prevent the wire harness W stored in the space S from being removed from the space S. The removal-preventing portion 5 integrally has the pivot 500 connected to the body portion 4 and the pivotal body 50 connected to the pivot 500. The pivotal body 50 has the pressing piece 51 extending from the pivot 500 into the space S, the pivotal body upper portion 53 that extends from the pivot 500 in the direction opposite to the direction in which the pressing piece 51 extends, and that is disposed upward of the pivot 500 in the height direction extending from the main surface 100*a* of the plate-shaped member 100, and the pivotal body lower portion (in this embodiment, the removal-preventing piece 52) that is integrally connected to the pivotal body upper portion 53 and disposed downward of the pivot 500. The surface 5*g*, on the side opposite to the space S, which extends from the pivotal body upper portion 53 to the pivotal body lower portion (removal-preventing piece 52) is disposed as the tilted guide surface 5*g* tilted so as to oppose the main surface 100*a* of the plate-shaped member 100. When the wire harness W having a thickness greater than the height of the space S is stored in the space S, the wire harness W is pressed against the tilted guide surface 5*g*, to cause the pivotal body 50 to pivot around the pivot 500 such that the pressing piece 51 is moved toward the body portion 4 in the space S, the pivotal body upper portion 53 is moved toward the main surface 100*a* of the plate-shaped member 100, and the pivotal body lower portion (removal-preventing piece 52) is moved into the space S. Thus, the wire harness W is press-deformed by the tilted guide surface 5*g*, and is moved into between the pivotal body lower portion (removal-preventing piece 52) and the main surface 100*a* of the plate-shaped member 100 in a state where the wire harness W has a reduced height, and the pivotal body lower portion (removal-preventing piece 52) is pushed upward toward the pressing piece 51, whereby the wire harness W can enter the space S. When the wire harness W enters the space S, the wire harness W is moved into between the pressing piece 51 and the main surface 100*a* of the plate-shaped member 100, thereby preventing the pivoting of the pivotal body 50 around the pivot 500 for moving the pressing piece 51 toward the main surface 100*a* of the plate-shaped member 100.

In the storage state where the wire harness W is stored in the space S, the pivotal body lower portion (removal-preventing piece 52) is released from the upward pushed state described above, and is moved to the position at which the entrance port E into the space S is closed to form a state where the stored wire harness W is prevented from being removed. Meanwhile, the pressing piece 51 is maintained so as to dispose the wire harness W thereunder, and reverse rotation of the pivotal body 50 is continuously prevented, and the pivotal body upper portion 53 is maintained, by the preceding rotation of the pivotal body 50, at a position (low position) lower, in the height direction Z, than a position before (at the time of) start of the rotation, specifically, at the same position as or at a position (low position) lower than one or both of the body portion 4 and the pivot 500 in the height direction Z. In such a configuration, the height of the routing structure 1 of the wire harness W can be reduced.

Although one embodiment of this invention has been described above, the embodiment is merely illustrative, and this invention is not limited to the embodiment. Various modifications such as additions and omissions may be made based on the knowledge of a person skilled in the art without departing from the scope of the claims.

Hereinafter, embodiments other than the above-described embodiment and modifications of the above-described embodiment will be described. Portions having the same functions as those in the above-described embodiment are designated by the same reference characters and the detailed description thereof is omitted. In addition, the above-described embodiment, and the following modifications and other embodiments may be combined to be implemented as appropriate as long as no technical contradiction arises.

In this invention, the space S formed between the body portion 4 and the main surface 100*a* may not necessarily be a space, directly disposed therebetween, across which the body portion 4 and the main surface 100*a* oppose each other. The space S is not particularly limited as long as the space S is formed in a section in the height direction Z between the body portion 4 and the main surface 100*a* so as to allow the wire harness W to be stored. For example, even if a portion for separating the body portion 4 and the main surface 100*a* in the up-down direction is disposed, the space S may be formed at either the upper portion or the lower portion.

In this invention, in a case where the engagement portion 3 is disposed, the position at which the engagement portion 3 is formed may be connected to the body portion 4. The connecting position is the base end portion of the body portion 4.

In this invention, components, such as the plate-shaped member 100 (plate-shaped portion), the engagement portion 3, the body portion 4, the removal-preventing portion 5, and an under base portion 6 (see FIG. 8 and FIG. 9) described below, in the routing structure 1 may be provided as separate members, or may be integrated with each other. For example, the body portion 4 and the removal-preventing portion 5 may be engaged and combined with each other so as to be pivotable via the pivot 500.

The plate-shaped portion of this invention is a plate-shaped portion disposed at a vehicle body. In this meaning, the plate-shaped portion includes not only the plate-shaped portion, such as the plate-shaped member 100 of this embodiment, disposed at the vehicle body, but also a plate-shaped portion of a part combined with the vehicle body or a plate-shaped portion (for example, a protector as a part for protecting wiring and a door trim as an inner lining part on an interior side of a door) of a part to be combined with a vehicle body.

Figure 8:
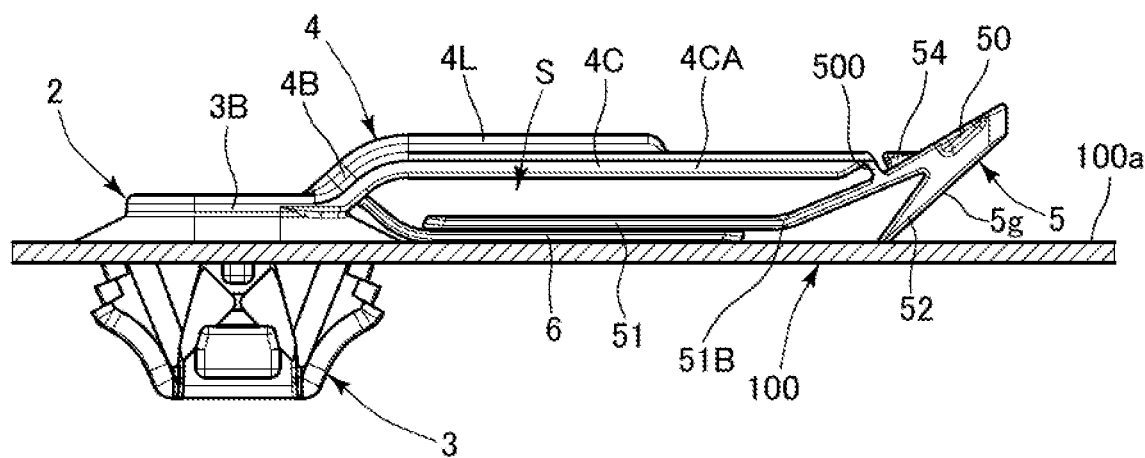
FIG. 8 is a front view illustrating a state where the wire harness has not been stored yet, in the routing structure shown in FIG. 1 according to a first modification.
Figure 9:
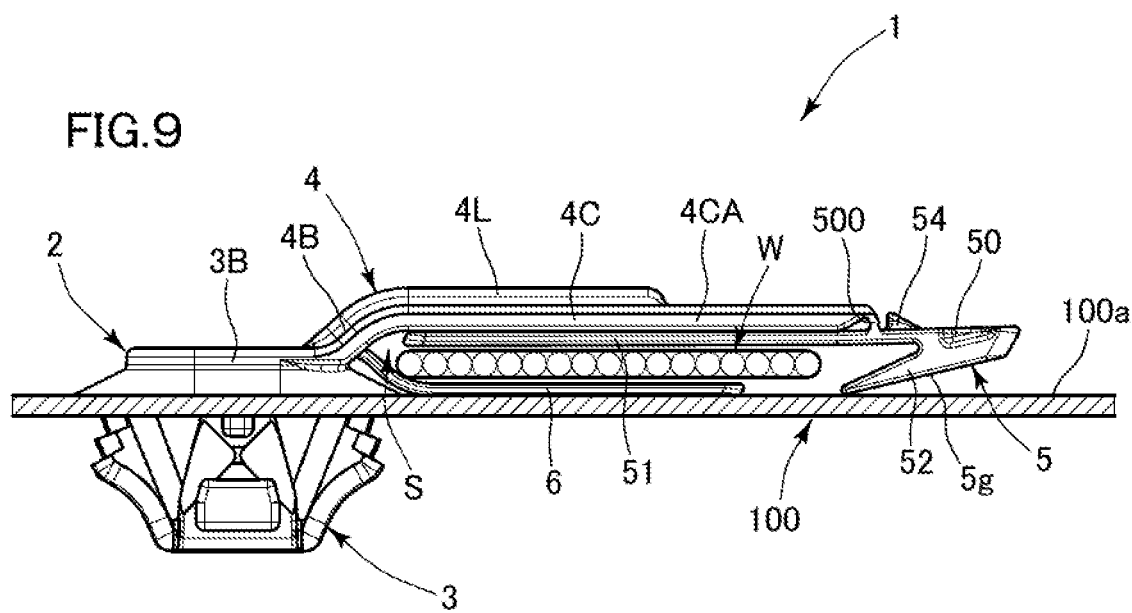
FIG. 9 is a front view illustrating a state where the wire harness has been stored in the routing structure shown in FIG. 8.

A first modification of the above-described embodiment will be described with reference to FIG. 8 and FIG. 9. In the first modification, the routing structure 1 of the wire harness W has the under base portion 6 disposed between the pressing piece 51 and the main surface 100*a* in the space S. The under base portion 6 is disposed between the main surface 100*a* and the stored wire harness W in the storage state. In the first modification, as shown in FIG. 9, the under base portion 6 extends from the body base end portion 4B into the space S, so as to be placed on the main surface 100*a*. When the wire harness W enters the space S, the wire harness W that pushes the removal-preventing piece 52 upward is moved onto the under base portion 6 from the main surface 100a, and is stored in the space S on the under base portion 6.

Figure 10:
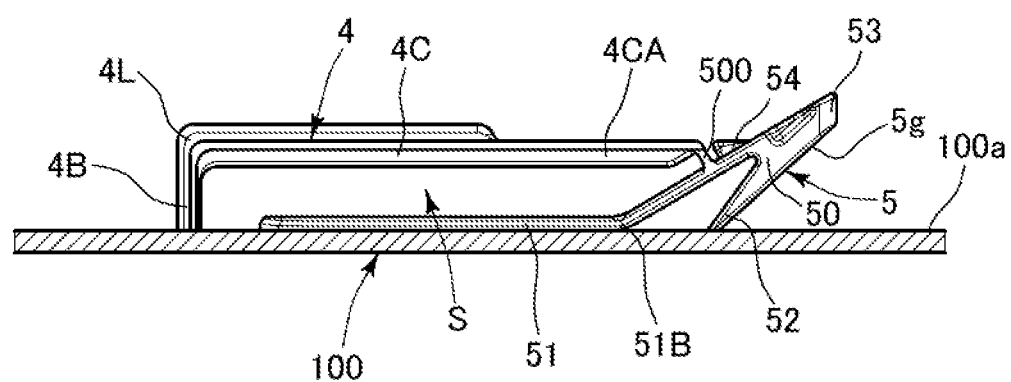
FIG. 10 is a front view illustrating a state where the wire harness has not been stored yet, in the routing structure shown in FIG. 1 according to a second modification.
Figure 11:
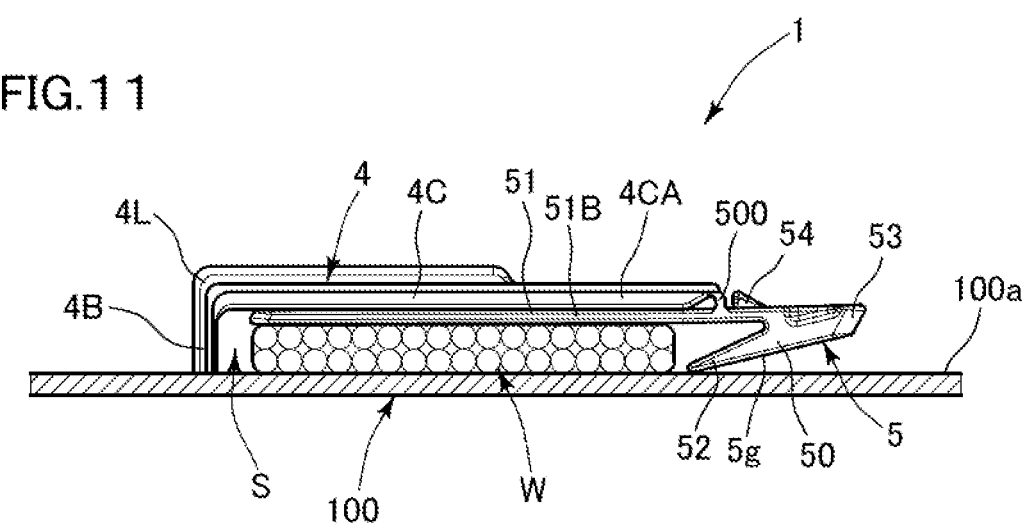
FIG. 11 is a front view illustrating a state where the wire harness has been stored in the routing structure shown in FIG. 10.

A second modification of the above-described embodiment will be described with reference to FIG. 10 and FIG. 11. In the second modification, in the routing structure 1 of the wire harness W, the engagement portion 3 is not provided, and the body portion 4 and the removal-preventing portion 5 form a part of the plate-shaped member 100 (plate-shaped portion). In this case, the body portion 4 can be, for example, fixed to and integrated with the plate-shaped member 100 by, for example, welding or fusing, and a member such as the clamp 2 other than the plate-shaped member 100 is not disposed. In the second modification, the body portion 4 is connected to the plate-shaped member 100 on the base end side (4B), is raised upward from the plate-shaped member 100, is bent at the leading portion, and extends along the main surface 100a of the plate-shaped member 100 toward the leading end side.

Figure 12:
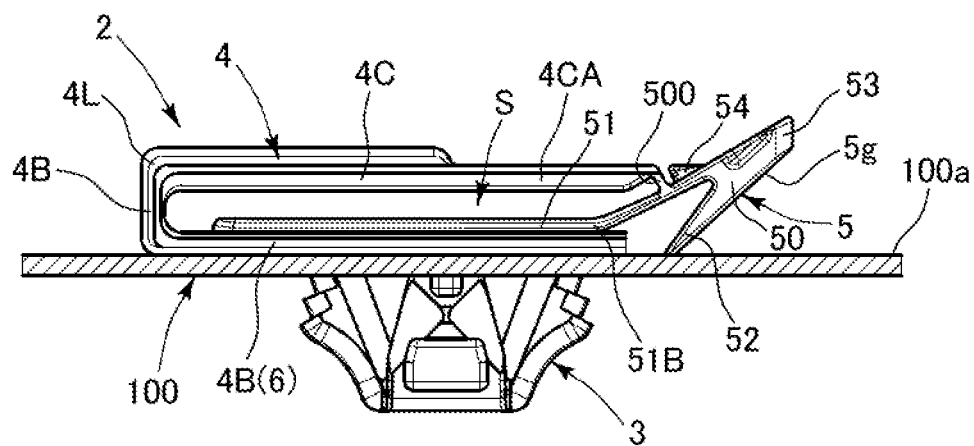
FIG. 12 is a front view illustrating a state where the wire harness has not been stored yet, in the routing structure shown in FIG. 1 according to a third modification.
Figure 13:
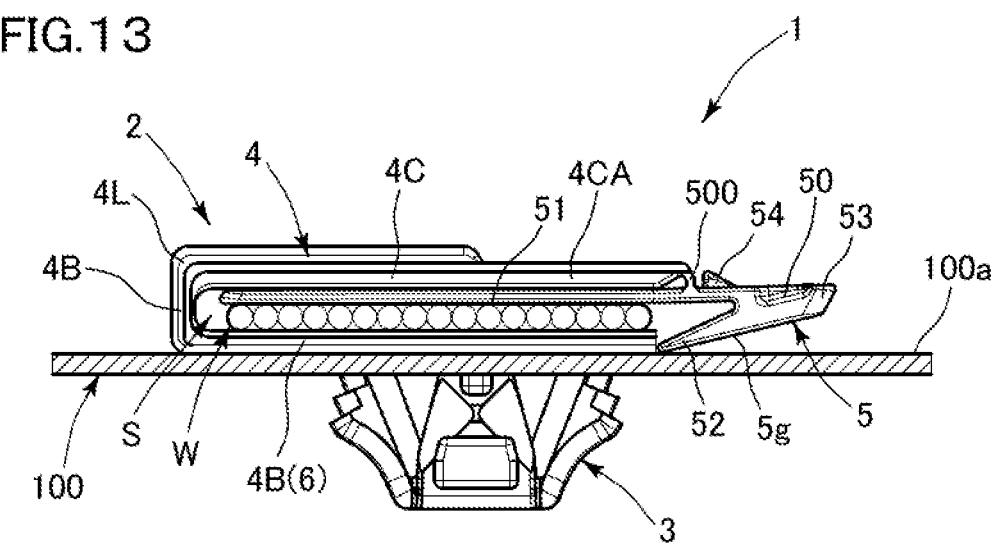
FIG. 13 is a front view illustrating a state where the wire harness has been stored in the routing structure shown in FIG. 12.

A third modification of the above-described embodiment will be described with reference to FIG. 12 and FIG. 13. In the third modification, the body portion 4 in the routing structure 1 of the wire harness W has a laterally-turned U-shape. One of linear sections of the U-shape and the bottom (the left end portion of the body portion 4 in the drawings) of the U-shape are disposed on the main surface 100a side of the plate-shaped member 100 (plate-shaped portion) as the body base end portion 4B of the body portion 4, and the other of the linear portions opposing the one of the linear sections extends from the bottom of the U-shape along the main surface 100a as the body extending portion 4C of the body portion 4. The removal-preventing portion 5 is disposed at the leading end of the body extending portion 4C. The body base end portion 4B that forms the one of the linear sections of the U-shape also serves as the under base portion 6 of the first modification, and has both the functions.

In the above-described embodiment and modifications, the drawings for the embodiment and the modifications are schematically illustrated to a certain degree. Particularly, the number of wires, and disposition, arrangement, and cross-sectional shapes of the wires in the wire harness W are drawn in an excessively organized manner, and may not necessarily be exactly as illustrated.

DESCRIPTION OF THE REFERENCE CHARACTERS 1 routing structure of wire harness
100 plate-shaped member (plate-shaped portion)
100a main surface
4 body portion
4B body base end portion
4C body extending portion
4CA body leading end portion
4L rib
5 removal-preventing portion
500 pivot
50 pivotal body
51 pressing piece
52 removal-preventing piece
53 pivotal body upper portion
54 reverse rotation preventing portion
5g tilted guide surface
6 under base portion
E entrance port into space S
S space
Y extending direction
W wire harness
Z height direction

What is claimed is:
1. A routing structure of a wire harness, the routing structure comprising:
a body portion having a base end side portion connected to or engaged with and fixed to a plate-shaped portion disposed at a vehicle body, and a leading end side portion extending along a main surface of the plate-shaped portion, the body portion configured to allow a wire harness to be stored from the leading end side portion toward the base end side portion in a space formed between the body portion and the main surface; and
a removal-preventing portion disposed at a leading end side of the body portion, the removal-preventing portion configured to prevent the wire harness stored in the space from being removed from the space, wherein
the removal-preventing portion integrally has
a pivot connected to the body portion, and
a pivotal body connected to the pivot,
the pivotal body has
a pressing piece extending from the pivot into the space,
a pivotal body upper portion extending from the pivot in a direction opposite to a direction in which the pressing piece extends, the pivotal body upper portion disposed upward of the pivot in a height direction extending from the main surface of the plate-shaped portion, and
a pivotal body lower portion integrally connected to the pivotal body upper portion and disposed downward of the pivot,
a surface, on a side opposite to the space, extending from the pivotal body upper portion to the pivotal body lower portion is disposed as a tilted guide surface tilted so as to oppose the main surface of the plate-shaped portion,
when the wire harness having a thickness greater than a height of the space is stored in the space, the wire harness is pressed against the tilted guide surface, to cause the pivotal body to pivot around the pivot such that the pressing piece is moved toward the body portion in the space, the pivotal body upper portion is moved toward the main surface of plate-shaped portion, and the pivotal body lower portion is moved into the space, so that the wire harness is press-deformed by the tilted guide surface and is moved into between the pivotal body lower portion and the main surface of the plate-shaped portion in a state where the wire harness has a reduced height, and the pivotal body lower portion is pushed upward toward the pressing piece to allow the wire harness to enter the space,
when the wire harness enters the space, the wire harness is moved into between the pressing piece and the main surface of the plate-shaped portion, so that the pivotal body is prevented from pivoting around the pivot such that the pressing piece is moved toward the main surface of the plate-shaped portion, and
in a storage state where the wire harness is stored in the space, the pivotal body lower portion is released from an upward pushed state, and is moved to a position at which an entrance port into the space is closed, and the stored wire harness is prevented from being removed, while the pressing piece is maintained so as to dispose the wire harness thereunder, reverse rotation of the pivotal body is continuously prevented, and the pivotal body upper portion having been moved downward by rotation of the pivotal body is maintained at a position lower than a position at a start of rotation of the pivotal body upper portion.

2. The routing structure of the wire harness according to claim 1, wherein the pressing piece is maintained so as to press the wire harness downward in the storage state.

3. The routing structure of the wire harness according to claim 1, comprising an under base portion disposed between the pressing piece and the main surface of the plate-shaped portion in the space, and held between the main surface of the plate-shaped portion and the stored wire harness in the storage state.

4. The routing structure of the wire harness according to claim 1, comprising a reverse rotation preventing portion capable of preventing the pivotal body from rotating in a direction opposite to a direction of rotation in which the pivotal body upper portion is moved downward, the pivotal body lower portion is moved toward the space, and the pressing piece is moved toward the body portion before the wire harness is stored.

5. The routing structure of the wire harness according to claim 1, wherein the body portion has a body leading end portion having a stiffness lower than that of the base end side portion and is bent more easily than the base end side portion, and can be bent and deformed together with the pivotal body lower portion when the pivotal body lower portion enters the upward pushed state.

* * * * *